UNITED STATES PATENT OFFICE.

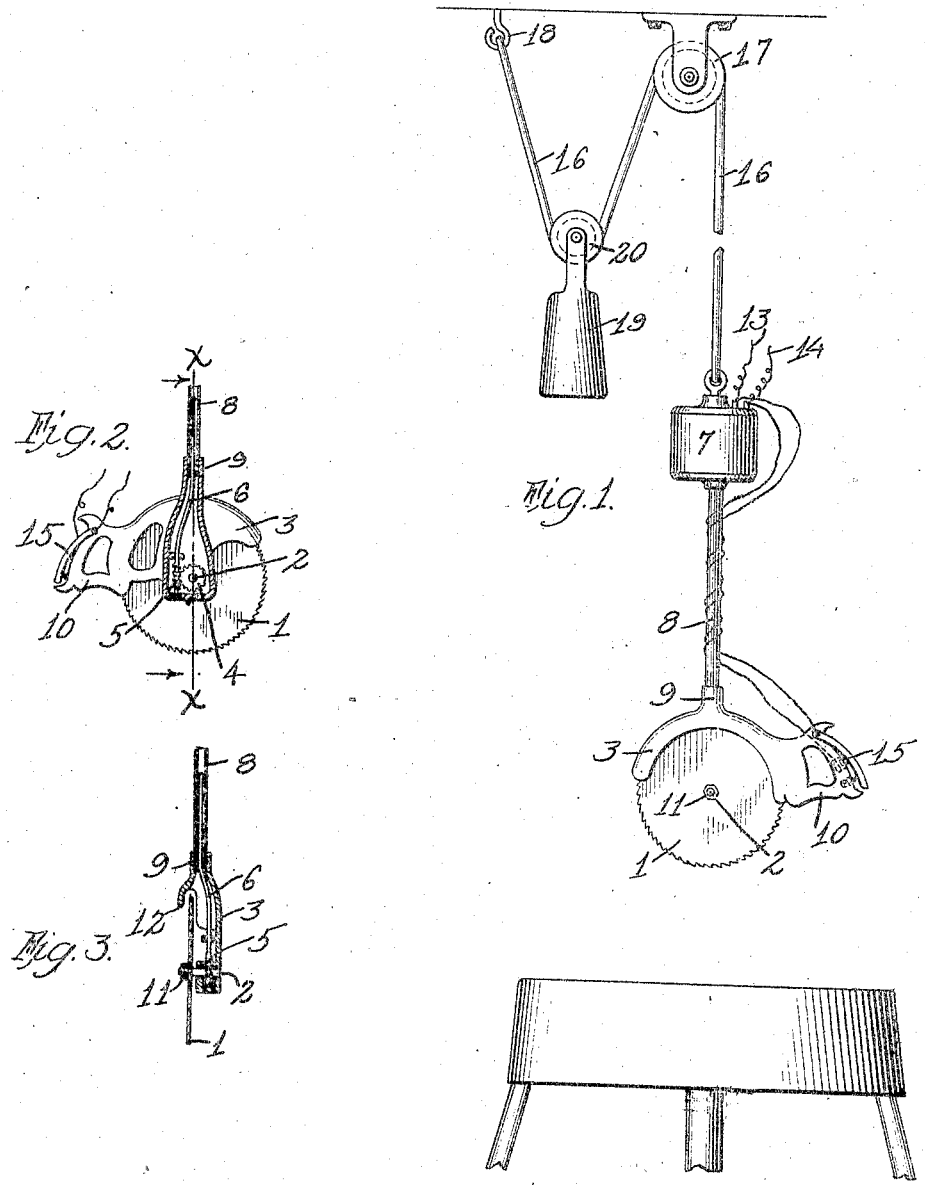

FREDERICK O. JOHNSON, OF DETROIT, MICHIGAN.

BUTCHER'S SAW.

1,303,908.            Specification of Letters Patent.    Patented May 20, 1919.

Application filed March 28, 1917. Serial No. 157,382.

*To all whom it may concern:*

Be it known that I, FREDERICK O. JOHNSON, a citizen of the United States, residing at Detroit, county of Wayne, State of Michigan, have invented a certain new and useful Improvement in Butchers' Saws, and declare the following to be a full, clear, and exact description of the same, such as will enable others skilled in the art to which it pertains to make and use the same, reference being had to the accompanying drawings, which form a part of this specification.

This invention relates to butchers' saws, and its object is to provide a power driven sawing machine in suspended relation with the motor in a manner to allow freedom of movement of the saw and further allowing it to be readily raised from working position or brought into use, and a particular feature of the invention resides in the method of suspension of both the motor and the saw, there being a flexible connection between the motor and saw allowing movement of the saw without necessity of materially moving the motor thus providing a device that is very easily handled, there being only the weight of the saw and its frame to be moved in the cutting operation. By this arrangement and mode of suspension the saw may be brought into use and easily manipulated in the cutting of a bone without necessity of handling any excessive weight, and upon completion of the operation, the saw and motor may be raised to inoperative position and out of the way of the operator. A further object of the invention is involved in the peculiarity of construction of the saw frame and its mode of support relative to the motor. These and other objects and the several novel features of the invention in its preferred form are hereinafter more fully described and claimed and shown in the accompanying drawings in which—

Figure 1 is an elevation of the butcher's saw embodying my invention.

Fig. 2 is a view of the side of the saw opposite to that shown in Fig. 1, showing the driving mechanism.

Fig. 3 is a vertical section taken on line x—x of Fig. 2.

The saw 1 is circular in form and is mounted on a shaft 2 shown more particularly in Fig. 3, which shaft is supported in a frame 3 inclosing the upper part of the saw and extending downwardly on one side thereof provided with bearings. A worm wheel 4 is mounted on the shaft between the bearings and is driven by a worm 5, which is also carried in bearings provided in the frame and is connected by means of a flexible shaft 6 with the shaft of the motor 7.

This flexible shaft 6 is inclosed in a flexible casing 8 of the usual form for such purposes and which is nonrotatable. This flexible casing 8 is inserted in a boss 9 on the upper part of the frame 3 and is secured thereto in any approved manner. The opposite end of the flexible casing is secured to the motor frame in a like manner, and the interior flexible shaft extends downward in the frame, as is shown in Fig. 3, terminating in the connection to the worm 5. The boss 9 is preferably so positioned that the saw and frame are supported at about the center of gravity so as to hold the saw naturally in a perpendicular plane as indicated, and by the arrangement described a very compact apparatus is provided. The frame is preferably formed of aluminum for the sake of lightness and is provided with a handle 10 at one side by means of which the saw may be manipulated.

As will be noted in Fig. 3 the shaft 2 extends beyond the bearing on one side on which the saw is mounted in the usual manner of mounting saws of this character, the shaft being adapted to receive the saw and a nut 11 provided for securing it in position. In order that the saw may be readily taken out of the framework and replaced therein, or others positioned therein, the frame on one side of the saw only, extends but slightly below the cutting edge thereof sufficient to cover the same as is indicated at 12. This enables the saw to be readily taken off from the shaft or replaced thereon without disassembling any of the other parts or removal of the shaft. The saw is, therefore, readily accessible for removal or repair. The motor is operated in the usual manner by a current from the supply wires 13 and 14, and a switch 15 controlling the circuit is carried in the handle as indicated, in position to be grasped by the hand in operating the saw and closed by gripping the handle so that upon release of the pressure upon the handle the motor is stopped. Switches of various characters, however, may be utilized for this purpose without departing from the spirit of this invention.

The motor is supported by means of a cable 16 running over a pulley 17 preferably secured to the ceiling, and the opposite end of the cable is secured to an eye 18 also fastened to the ceiling. Between the pulley 17 and eye 18 is a counter weight 19 running freely, by means of a pulley 20, on the cable, and this counter weight takes up the slack of the cable and is of a size to counterbalance the weight of the motor, saw, etc., and it is to be understood that the cable 16 is of sufficient length to allow the saw to be raised out of the way of the operator when not in use, yet readily grasped and pulled downward to operative position when required. The length of the flexible shaft and casing therefor by means of which the saw frame is supported is sufficient to allow for the usual movement of the saw across the bone to be cut without material deflection of the motor from position normally occupied by gravity whereby movement of the saw is freely and easily produced due to its light weight and freedom from fixed attachment to any part. By this arrangement the operator is relieved of necessity of carrying or moving the weight of the motor as well as the saw in the cutting operation. While I have shown a worm and worm wheel as the preferred method of operating the saw, other types of gearing may be utilized as will be readily understood by those familiar with the art, but by reason of its compactness I prefer to use the type shown and when such driving mechanism is utilized I prefer to position the worm on the side of the worm wheel adjacent the handle of the frame, whereby the shaft is positioned substantially on the center of gravity from the front to the back of the frame, as will be understood from Fig. 2, the said shaft also being positioned transversely in a like manner to properly balance the suspended weight.

From the foregoing description it becomes evident that the device is simple and compact in form light in weight so far as the parts to be moved by the operator are concerned, and that the various objects of the invention are secured by the general arrangement and construction and mode of suspension of the parts as described.

Having thus fully described my invention, its utility and mode of operation, what I claim and desire to secure by Letters Patent of the United States is—

1. A power driven saw for butchers' use, consisting of a circular saw, a frame therefor, a motor for driving the saw, a flexible shaft connected with the motor and adapted to drive the saw, a flexible casing for the shaft secured to the saw frame and motor frame respectively, whereby the saw may be suspended beneath and freely movable relative to the motor, and a counter weighted cable by means of which the motor is suspended.

2. A portable motor and saw of the character described, consisting of a circular saw, a frame therefor provided with a handle, the frame extending over one side only of the saw, a shaft carried in bearings on said side, the opposite side of the frame extending but a short distance of the edge of the saw to cover the cutting edge only allowing the saw to be readily placed in position on the shaft from the said last named side of the frame, a motor, a flexible shaft by means of which power is transmitted from the motor to the saw to drive the same, a flexible casing for the shaft attached to the saw frame and by means of which it is suspended, and a counter weighted cable suspending the motor.

3. In a device of the character described, a motor, a counter weighted cable for suspending the same, a circular saw, a frame therefor by means of which the saw may be manipulated, a flexible shaft between the motor and saw and a flexible casing for the shaft providing the sole means of suspending the saw from the motor.

4. A power driven saw for butchers' use consisting of a circular saw, a frame therefor, a motor for driving the same, a flexible shaft connected with the motor and adapted to drive the saw, a flexible casing for the shaft, the casing being connected to the motor frame and saw frame respectively and of a length to allow freedom of movement of the saw relative to the motor, and a counter-weighted cable for suspending the motor, said saw being provided with a shaft and said saw frame being provided with bearings for the shaft on one side of the saw, a worm on the shaft, and a worm on the said flexible shaft for driving the same, the frame being recessed on said bearing side of the frame to receive the flexible shaft, said recessed portion terminating in a circular part at the upper end providing a means for attaching the flexible casing thereto, said frame also having a portion integral with the shaft supporting portion providing a guard for the upper side of the saw, and a handle on the said frame.

In testimony whereof I sign this specification.

FREDERICK O. JOHNSON.